United States Patent [19]

Adams

[11] 4,027,771

[45] June 7, 1977

[54] PALLET TRUCK FOR USE WITH FORK LIFT TRUCK

[76] Inventor: Thomas F. Adams, 28334 Ridgebrook Road, Farmington Hills, Mich. 48024

[22] Filed: May 8, 1975

[21] Appl. No.: 575,971

[52] U.S. Cl. .............................. 214/621; 214/750; 280/43.12

[51] Int. Cl.² .......................................... B66F 9/12

[58] Field of Search .......... 214/620, 621, 750, 515; 280/43.12

[56] References Cited

UNITED STATES PATENTS

| | | | |
|---|---|---|---|
| 2,601,163 | 6/1952 | Miller | 214/620 |
| 2,738,222 | 3/1956 | Needham | 214/620 |
| 2,796,186 | 6/1957 | Arnot | 214/621 |
| 2,833,435 | 5/1958 | Levy | 214/620 |
| 3,462,167 | 8/1969 | Rateau | 280/43.12 |

FOREIGN PATENTS OR APPLICATIONS

| | | | |
|---|---|---|---|
| 708,468 | 4/1965 | Canada | 214/750 |
| 643,524 | 6/1962 | Canada | 214/515 |
| 760,808 | 11/1956 | United Kingdom | 214/750 |

*Primary Examiner*—L. J. Paperner

*Assistant Examiner*—Ross Weaver

*Attorney, Agent, or Firm*—Robert G. Mentag

[57] ABSTRACT

A pallet truck that may be used for loading or unloading trucks and van trailers under circumstances where no shipping dock, well or ramp is available. These pallet truck forks are constructed and arranged to allow the insertion of the fork tines of a fork lift truck, whereby the pallet truck with a palleted load thereon may be lifted from ground level by the fork lift truck and placed on another level such as in a truck or van trailer, and conversely lowered. The fork truck fork tines are then removed and the pallet truck employed to move the palleted load into its proper position in the truck or van trailer. The pallet truck forks may be constructed for the reception of the fork tines of a fork lift truck from either the front ends thereof or the rear ends thereof. The pallet truck forks may be provided with fork tines for raising a load for the insertion of timbers and the like thereunder, to permit the subsequent insertion of the pallet truck forks under the load for raising and moving the same. This pallet truck design may also be utilized for all conventional pallet truck uses.

19 Claims, 27 Drawing Figures

PALLET TRUCK FOR USE WITH FORK LIFT TRUCK

SUMMARY OF THE INVENTION

This invention relates generally to the pallet truck art, and more particularly, to a pallet truck which may be used in conjunction with a fork lift truck for moving palleted laods safely and methodically from one work level to another, and then can move cargo about on that work level, whereas a fork lift truck alone can only reach the first three or four foot edge of any elevated work level.

Most large business establishments have truck docks or truck wells to permit the movement of fork lift trucks and pallet trucks directly into a truck or van trailer for loading and unloading palleted loads. However, there are thousands of small business establishments which ship and receive palletized material which do not have a truck dock or truck well. The last mentioned small businesses are at a disadvantage in that they cannot drive fork trucks or move pallet trucks into trucks or van trailers to load or unload the same, whereby the cost of such loading or unloading operations is increased for such business establishments. Under the last mentioned circumstances, in order to unload palleted loads it is necessary to employ some means for dragging the palleted loads to the rear end of the truck or van trailer, as by means of a pull chain apparatus or the like, so that the load can be reached and picked up on the fork tines of a fork lift truck. The last mentioned unloading system is time-consuming, costly and hazardous. When a truck dock or truck well is not available, a loading operation is usually carried out by using a fork lift truck to move a first loaded pallet into a truck or van trailer by pushing a second loaded pallet against the first loaded pallet, and so forth. This method of loading a pallet is unsafe, and usually only works for loading approximately the rear 12 to 15 feet of a long van trailer. Another unsafe method involves the use of long timbers to push a loaded pallet into a truck or van trailer.

Heretofore, pallet trucks have been used to load and unload trucks or long van trailers, but the use of a pallet truck in a truck or van trailer has proven dangerous, because of the necessary "jockeying" of the pallets inwardly from the back edge of the truck or van trailer so that they can be picked up by the prior art type pallet trucks. Heretofore, the prior art type pallet trucks have been used to unload palleted loads from the front end of the trucks and van trailers, but this type of operation is hazardous, especially when inching the palleted loads to the proper position at the rear edge of the truck or van trailer to permit a fork lift truck to pick up the palleted load. If palleted load were too wide to turn around in the width of a van, the prior art trucks were practically no help at all. In the past, under such circumstances, many injuries to personnel have ocurred due to pallet trucks (and/or palleted loads) falling off truck or van trailers.

In view of the foregoing, it is an important object of the present invention to provide a novel and improved pallet truck which overcomes the aforementioned disadvantages of loading and unloading trucks and van trailers with the prior art pallet trucks, and where no truck docks or truck wells are provided, and still does all conventional pallet-moving work as well.

It is another object of the present invention to provide a novel and improved pallet truck which can be used in conjunction with a fork truck for quickly, economically and safely loading and unloading palleted loads from a truck or van trailer without the use of a truck dock or truck well.

It is still another object of the present invention to provide a novel and improved pallet truck which is constructed and arranged to allow the insertion of the fork tines of a fork lift truck into the forks of the pallet truck, whereby the pallet truck with a palleted load thereon may be lifted from one work level to another, without the aid or use of a ramp or elevator.

It is still another object of the present invention to provide a novel and improved pallet truck which is provided with hollow forks, and retainer loop means at the rear end of each of the hollow forks to prevent the pallet truck and load from tipping off the forks if the fork tines are short or not fully inserted, whereby the fork tines of a fork lift truck may be inserted through the retainer loop means and into the hollow pallet truck forks, and the pallet truck may be lifted with or without a load thereon and quickly and safely moved from one work level to another, as, for example, from the ground level up into a truck or van trailer. The last mentioned action may be reversed for unloading palleted load from a truck or van trailer.

It is still another object of the present invention to provide a novel and improved pallet truck in which the forks are each provided on their lower side with a channel member for the reception of the fork tines of a fork lift truck to permit lifting of the pallet truck by the fork lift truck, either with or without a palleted load, and to move the pallet truck between various work levels in a quick, efficient and economical manner, and with the channel member being provided with retainer means for retaining the fork lift truck fork tines in the channel members.

It is another object of the present invention to provide a novel and improved pallet truck which has two forks constructed and arranged to permit the insertion from the front end thereof of the fork tines of a fork lift truck for lifting of the pallet truck, for moving of the same between different work levels and between different work areas.

It is still another object of the present object to provide a novel and improved pallet truck in which the forks are each provided on their lower side with a channel member for the reception of the fork tines of a fork lift truck to permit lifting of the pallet truck by the fork lift truck, either with or without a palleted load, and to move the pallet tuck between various work levels in a quick, efficient and ecnomical manner, and with the channel member being provided with retainer means for retaining the fork lift truck fork tines in the channel members.

It is another object of the present invention to provide a novel and improved pallet truck which has two forks constructed and arranged to permit the insertion from the front end thereof of the fork tines of a fork lift truck for lifting of the pallet truck, for moving of the same between different work levels and between different work areas.

It is still another object of the present invention to provide a novel and improved pallet truck which is provided with fork tines on the forks thereof for raising a non-palletized load, for the insertion of timbers and the like thereunder, to permit the subsequent insertion of the pallet forks under the load for raising and moving the same.

Other objects, features and advantages of this invention will be apparent from the following detailed description, appended claims, and the accompanying drawings.

DESCRIPTION OF THE PREFERRED EMBODIMENTS

Figure 1:
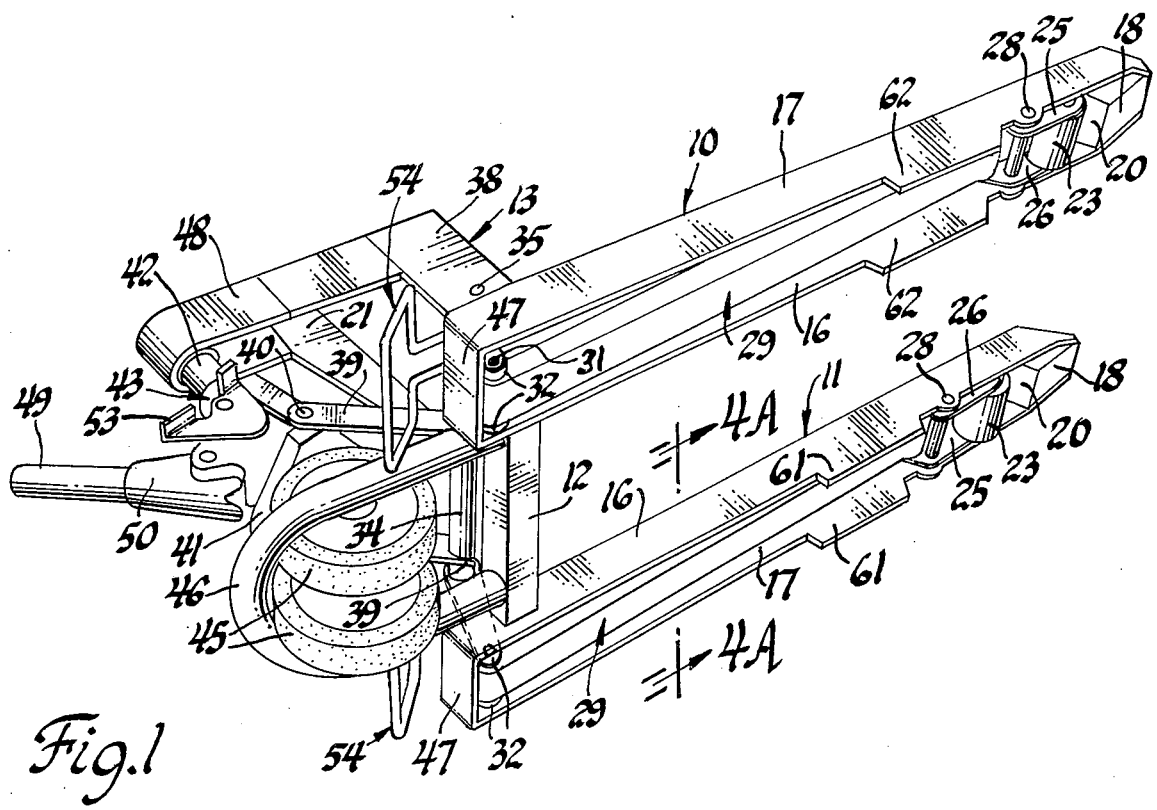
FIG. 1 is a bottom perspective view of a pallet truck illustrating a first embodiment of the invention.

Referring now to the drawings, and in particular to FIG. 1, wherein is illustrated a first embodiment of the invention, the numerals 10 and 11 generally designate the pallet truck forks. The pallet truck forks 10 and 11 are laterally spaced apart and they are not interconnected at their front ends, but they are interconnected at their rear ends by a transverse, formed section frame member 12. A yoke or frame, generally indicated by the numeral 13, is fixedly mounted across the rear end of the forks 10 and 11. The forks 10 and 11 are identically constructed, and fork 10 will be described in detail and the same reference numeral will be applied to fork 11.

Figure 3:
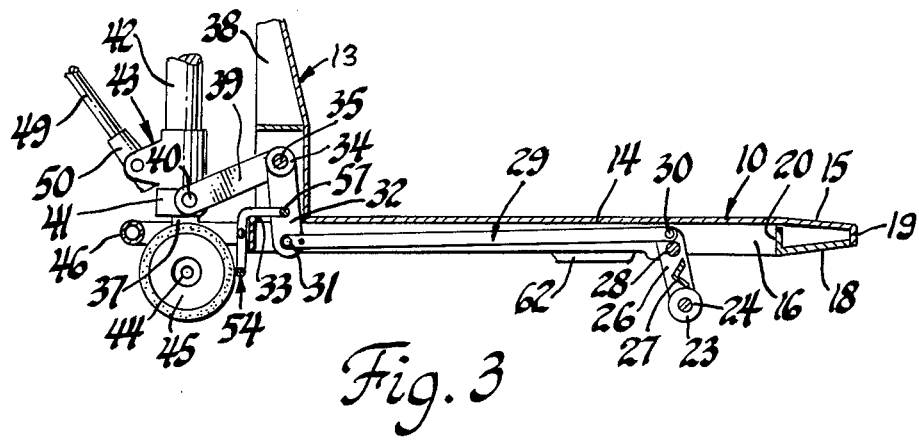
FIG. 3 is a fragmentary, longitudinal section view of the pallet truck structure shown in FIG. 2, taken substantially along the line 3—3 thereof, and looking in the direction of the arrows.
Figure 4:
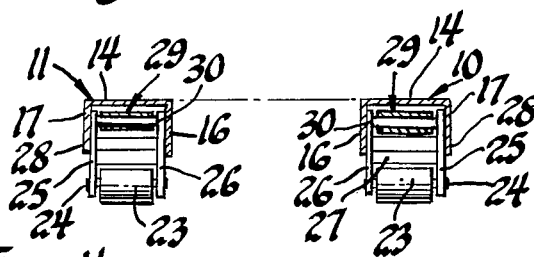
FIG. 4 is an elevational section view of the pallet truck structure illustrated in FIG. 2, taken substantially along the line 4—4 thereof, and looking in the direction of the arrows.

As shown in FIG. 3, the pallet truck fork 10 comprises an elongated flat top wall or plate 14 which has an integral front end or nose portion 15 that tapers downwardly. As shown in FIG. 1, the fork 10 further includes an integral inner side vertical wall 16 and an integral outer side vertical side wall 17. As shown in FIG. 4, the sidewalls 16 and 17 are integrally formed with the top wall 14 so as to form an elongated fork having an inverted channel shape cross section. The sidewalls 16 and 17 extend forwardly along the sides of the front tapered end. As shown in FIG. 3, the fork tapered front end is enclosed with a front wall 19 and fitted with a skid ramp consisting of a tapered bottom wall 18 and a rear wall 20. The front end enclosure walls 18, 19 and 20 may be fixedly secured in place by any suitable means, as welding.

As shown in FIGS. 3 and 4, the fork 10 is rollably supported at its forward end by a load roller 23. The load roller 23 is rotatably mounted on a suitable shaft 24 between a pair of carrier arms 25 and 26. One end of the shaft 24 is operatively mounted on the lower end of the carrier arm 25, and the other end is operatively mounted on the lower end of the carrier arm 26. As shown in FIGS. 3 and 4, the carrier arms 25 ad 26 are fixed interconnected by a transverse, angular, carrier bracket 27. As shown in FIGS. 3 and 4, the front ends of the carrier arms 25 and 26 are pivotally mounted on a suitable pivot pin 28 which has its ends operatively mounted in the front sidewalls 16 and 17. The load roller 23 is adapted to be moved between the position shown in FIG. 1 with the fork 10 in a lowered position, and the position shown in FIGS. 3 and 4 where the fork 10 is in a raised position for moving a load.

As best seen in FIG. 3, the load roller 23 is moved between the two positions shown in FIGS. 1 and 3 by an elongated push rod 29. As shown in FIG. 3, the front end of the push rod 29 is pivotally connected to the upper ends of the carrier levers 25 and 26 by a suitable push rod shaft 30. The rear end of the push rod 29 is pivotally mounted by an eccentric pin 31 between the lower ends of a pair (FIG. 5) of push rod operating levers 32. As shown in FIG. 3, the levers 32 extend upwardly through an opening 33 formed in the rear end of the fork top plate 14. The push rod operating levers 32 are intergrally attached at their upper ends to a tubular shaft 34 which is pivotally mounted on a horizontal lever shaft 35.

The yoke or frame member 13 includes a pair of laterally spaced apart, upwardly extended side members 38 which have their lower ends secured by any suitable means, as by welding, to the forks 10 and 11. The lever shaft 35 has its ends operatively supported by the laterally spaced apart frame members 38. As shown in FIGS. 1 and 3, a first intermediate lever 39 has one end thereof fixedly attached by any suitable means, as by welding, to the tubular shaft 34. The other end of the intermediate lever 39 is pivotally secured by a suitable trunnion pivot pin 40 to one side of a trunnion support member 41. As illustrated in FIG. 1, a second intermediate lever 39 is laterally spaced apart from the first mentioned lever 39, and it is fastened, in the same manner as the first lever 39, to the tubular shaft 34 and to the other side of the trunnion support member 41.

The trunnion support member 41 is fixedly secured to a pump mounted shaft 37 (FIG. 3) which carries a hydraulic pump, generally indicated by the numeral 43. A transverse wheel axis 44 is operatively mounted on the lower end of the shaft 37 at a position below the trunnion support member 41. A pair of laterally spaced apart steering wheels 45 are operatively mounted on the wheel axle 44. The steering wheels 45 may have tires made of any suitable material, for example, steel, rubber, polyurethane, and the like.

Figure 24:
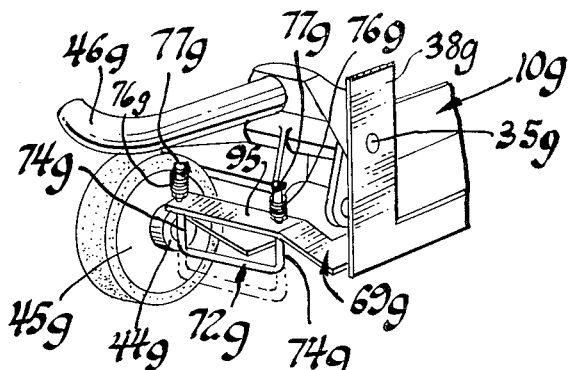
FIG. 24 is a fragmentary, elevational view of the rear end of a pallet truck fork of the type shown in FIGS. 13 through 18, and showing a modified fork tine retainer means.

As shown in FIG. 1, a U-shaped guard member 46 is mounted around the steering wheels 45 and/or pump 43. The legs of the U-shaped guard member 46 are fixedly connected, as by welding, to the transverse frame member 12, or they may be located higher onto the yoke member 13 as shown in FIG. 24. The rear ends of the forks 10 and 11 are enclosed by a rear end wall 47.

As shown in FIG. 1, the upper end of the pump cylinder rod 42 is operatively mounted in a suitable mounting bracket 48. The bracket 48 is attached, as by welding, to the frame members 38 and to a pair of yoke reinforcements 21. The pallet truck is provided with a suitable handle 49 which has its lower end operatively attached to the pump operating lever 50. A three-position foot control pedal 53 controls the pump for up, down, and neutral operating conditions of the pump 43.

Figure 2:
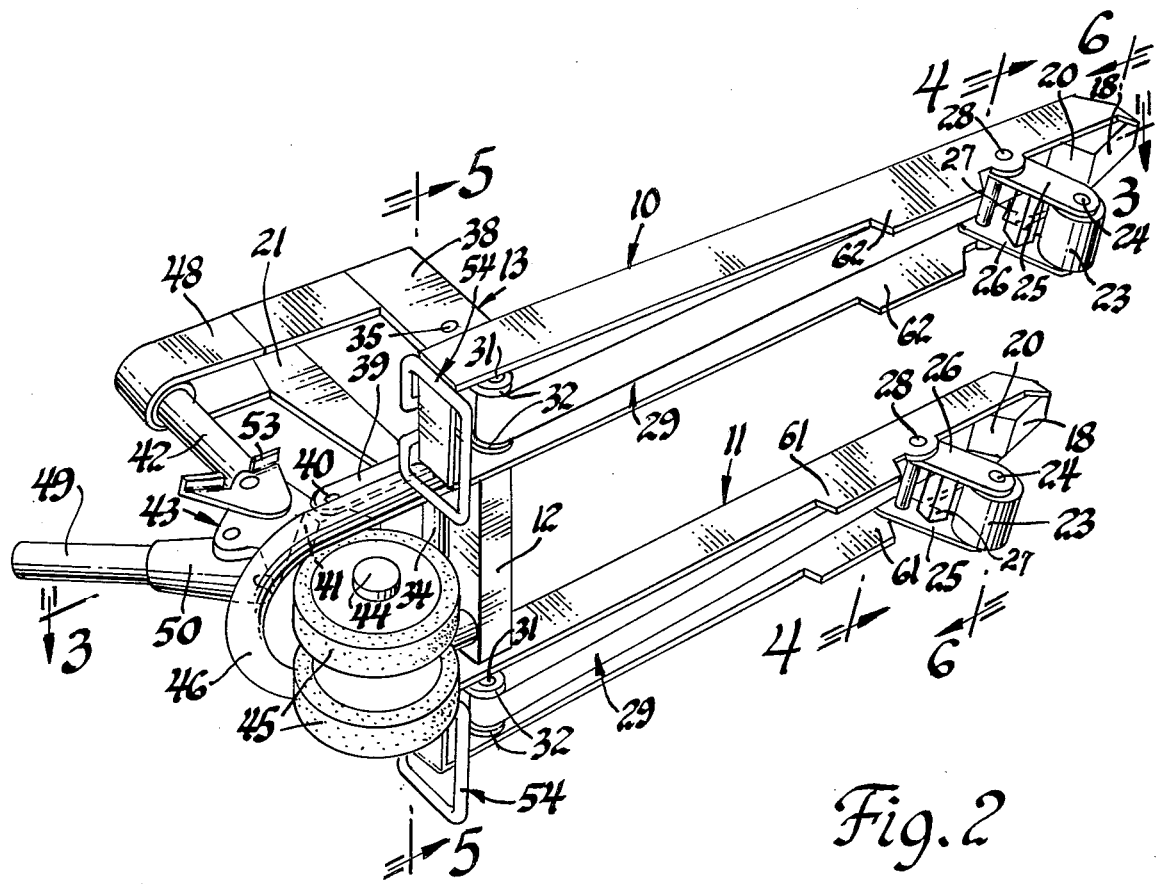
FIG. 2 is the same view as FIG. 1, but showing the pallet truck wheels moved to the down position to permit movement of the truck with pallet.
Figure 5:
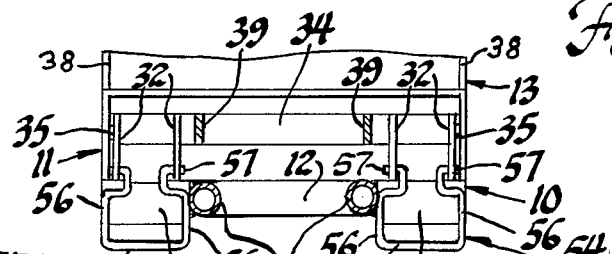
FIG. 5 is a fragmentary, rear end elevational view, partly in section, of the pallet truck structure illustrated in FIG. 2, taken along the line 5—5 thereof, and looking in the direction of the arrows.

As shown in FIGS. 1, 3 and 5, each of the forks 10 and 11 is provided with a fork truck fork tine loop shaped retainer member, generally indicated by the numeral 54. As best seen in FIG. 5, each of the fork tine retainer members 54 includes a transverse rod portion 55, to each of the outer ends of which is integrally formed an upwardly extended carrier arm or rod portion 56. A mounting shaft 57 is integrally formed on the upper end of each of the carrier arms 56. The mounting shafts 57 are fixedly mounted in suitable openings in the push rod levers 32, as by welding, in a position above the push rod pins 31. It will be seen that when the push rods 29 are in the position shown in FIG. 1, the fork tine retainer members 54 are in a raised position, as shown in FIGS. 2 and 5, and when the load rollers 23 are moved to a position to raise the forks 10 and 11 to raise a load from the ground, the fork tine retainer members 54 are moved downwardly to a position to permit insertion therethrough of a fork truck fork tine.

Figure 4A:
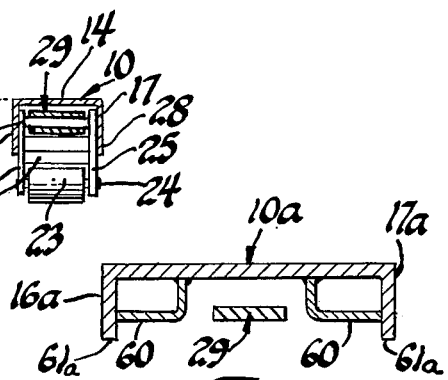
FIG. 4A is an elevational section view of a modified pallet truck fork that may be employed in the first embodiment illustrated in FIG. 1, taken along the line 4A—4A of FIG. 1, and looking in the direction of the arrows.

FIG. 4A is an elevational, sectional view of a modified pallet truck structure which may be employed in the structure of the first embodiment described hereinbefore in FIGS. 1 through 6. In the modified structure shown in FIG. 4A, a longitudinally extended angle bar 60 is fixedly mounted inside the fork 10a, on each side of the push rod 29. The longitudinal angle bars 60 provide strength to the fork 10a and provide ledges or rests for a fork truck fork tine so that it does not touch the push rod 29. The longitudinal angle bars 60 may be fixed in place by any suitable means, as by welding. It will be understood that both of the forks 10a and 11a on a pallet truck would be provided with the modified angle bar structure of FIG. 4A.

Figure 5A:
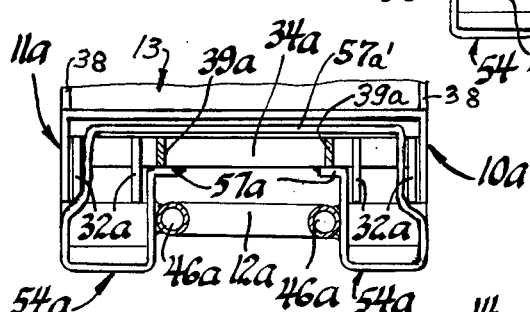
FIG. 5A is a view similar to FIG. 5, and showing a modified loop structure for retaining a set of fork lift truck tines in position under a pallet truck.
Figure 6:
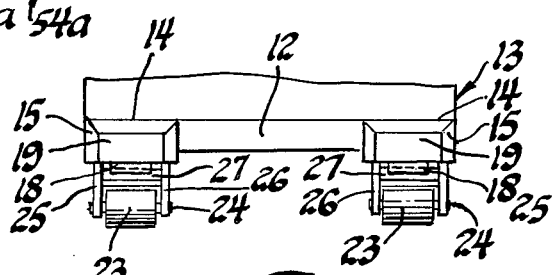
FIG. 6 is a fragmentary, front end elevational view of the pallet truck structure illustrated in FIG. 2, taken along the line 6—6 thereof, and looking in the direction of the arrows.

FIG. 5A is a view similar to FIG. 5 and it shows a modified loop retainer structure for retaining a set of fork lift truck fork tines in position under the forks 10a and 11a. In the embodiment of FIG. 5A, the retainer loop mounting shafts 57a are attached directly to the top of tubular shaft 34. The inner mounting shafts 57a are attached, as by welding, to tubular shaft 34a. The outer mounting shafts 57a are integrally connected by an elongated shaft 57a' which is attached to the tubular shaft 34 by any suitable means, as by welding. The loop retainers 54a would function in the same manner as the previously described loop retainer members 54 of FIG. 5.

FIGS. 1 through 6 illustrate the invention as being applied to a manually operated hydraulic pallet jack, but it will be understood that the invention is also applicable to electric-battery powered pallet jacks or pallet movers. The hydraulic pump 43, the steering wheels 45, the load rollers 23 and the interconnecting structure for raising and lowering the forks 10 and 11 are conventional pallet truck structures.

In use, assuming that the load rollers 23 are in the retracted position shown in FIG. 1, the pallet truck may be moved so as to insert the forks 10 and 11 into a pallet. Pallets are normally of a standard height, although they may be made of various materials. Wood pallets, for example, are usually constructed of cross boards nailed to a 2 × 4 frame so as to provide an opening or cavity of about 3 ⅝ inches for the insertion therein of the forks of a pallet truck or the fork tines of a fork lift truck. After the pallet truck's forks 10 and 11 are inserted into a pallet and control pedal 53 is actuated, the pressure in the hydraulic jack 43 is raised by moving the handle 49 upwardly and downwardly in a pumplike action. As the pressure in the pump 43 is built up, the pump cylinder rod 42 is moved upwardly out of the pump cylinder and the rear end of the frame 13 is lifted upwardly.

As the pump cylinder rod 42 raises the rear end of the frame 13, the intermediate levers 39 are pivoted upwardly about the trunnion pivot pins 40 in a counterclockwise direction, as viewed in FIG. 3. The counterclockwise, upward rotation of the intermediate levers 39 causes the tubular shaft 34 to be rotated also in a counterclockwise direction, which in turn rotates the push rod levers 32 in a counterclockwise direction so as to move the lower ends thereof forwardly, as viewed in FIG. 3. The forward movement of the lower ends of the levers 32 moves the push rods 29 forwardly which results in the load rollers 23 being moved downwardly. As shown in FIG. 3, the forward ends of the push rods 29 rotate the carrier levers 25 and 26 clockwise about the pivot shafts 28, so as to move the load rollers 23 downwardly from their respective fork.

The last described action elevates the forks 10 and 11 upwardly for a distance of approximately 1½ to 5½. It can be seen that the direct pump action working with the last described levers and push rods causes the entire frame 13 and the forks 10 and 11 of the pallet jack to rise upwardly in an even manner. When the force on the push rods 29 is relieved, gravity causes the load rollers 23 to pivot back upwardly, to thus lower the forks 10 and 11. Normally, the lowered forks 10 and 11 are 2¼ to a maximum height of about 3⅝ from the ground surface, so that most truck forks can pass freely into a conventional pallet. It will be understood that when the pallet truck frame 13 and forks 10 and 11 are in the raised position shown in FIG. 3, that a palleted load on the forks 10 and 11 may be moved about on the tricycle type wheel roller structure of the pallet truck.

As shown in FIG. 1, when the pump pressure is off, the bar loops or fork tine retainers 54 are raised to a position above the bottom clearance of the frame and forks of the pallet truck. The bar loops 54 are disposed on each side of the two pump or steering wheels 45, and in a position slightly ahead thereof. The pump wheels 45 are normally about 7 inches in diameter. As the pump's cylinder pressure is increased, the ends of the intermediate levers 39 that are attached to shaft 34 are swung upwardly, the carrier levers 25 and 26 are swung about shafts 28, causing shafts 30 to be moved forwardly, as viewed in FIG. 3, thus forcing the carrier levers 25 and 26 and wheels 23 downwardly to the position shown in FIG. 3. The bar loops 54 are also pivoted downwardly so that each of the loop openings swings beneath and directly behind the forks 10 and 11, thus creating a pair of openings for the insertion of a pair of fork lift tines. Accordingly, it will be seen that the loop bar retaining means 54 surrounds a fork lift tine and prevents movement of the same in any direction. The bottoms of the pallet jack forks 10 and 11 prevent upward fork tine pivoting action.

After the pallet truck has had its forks 10 and 11 moved into a pallet and the load wheels 23 lowered, foot pedal 53 is moved to the neutral position, and the palleted load can be moved to a new position. The handle 49 is moved to the vertical position so as to permit a fork lift truck to be engaged with the forks 10 and 11. If the pallet truck is provided with a conventional hand brake system, then the steering wheels 45 are locked with the hand brake system. The fork lift truck is positioned in alignment with the pallet truck, and with its fork tines laterally disposed and vertically disposed so that they can be moved forward through the loop bars 54 and underneath the hollow forks 10 and 11. The pallet truck with its palleted load thereon can then be lifted upwardly by the fork lift truck and moved to any desired new position. The pallet truck with its palleted load can be lifted from ground level upwardly and disposed in a truck or van trailer. The fork lift truck can then back away from the pallet truck and the operator can move the pallet truck forwardly and the palleted load thereon into a desired position in the truck or van trailer.

A pallet jack normally is able to raise about 5 inches about its normal road or floor clearance of approximately 1 to 1 ½ inch, and the bar loops 45 swing down 2 to 2 ½inch. Accordingly, there is still ample road clearance for passing over rough or uneven surface areas with the frame and forks 10 and 11 moved upwardly in a raised position.

The side bars 61 and 62 shown in FIG. 1 can be employed to maintain the tips of the fork lift tines directly under the pallet forks 10 and 11. Additional vertical bars or fences could be added to the fork edges, directly behind the front wheel pivot shafts 28 provided they do not interfere with the road clearance of the forks 10 and 11 when the pallet truck is moved about in a lowered position.

Figure 8:
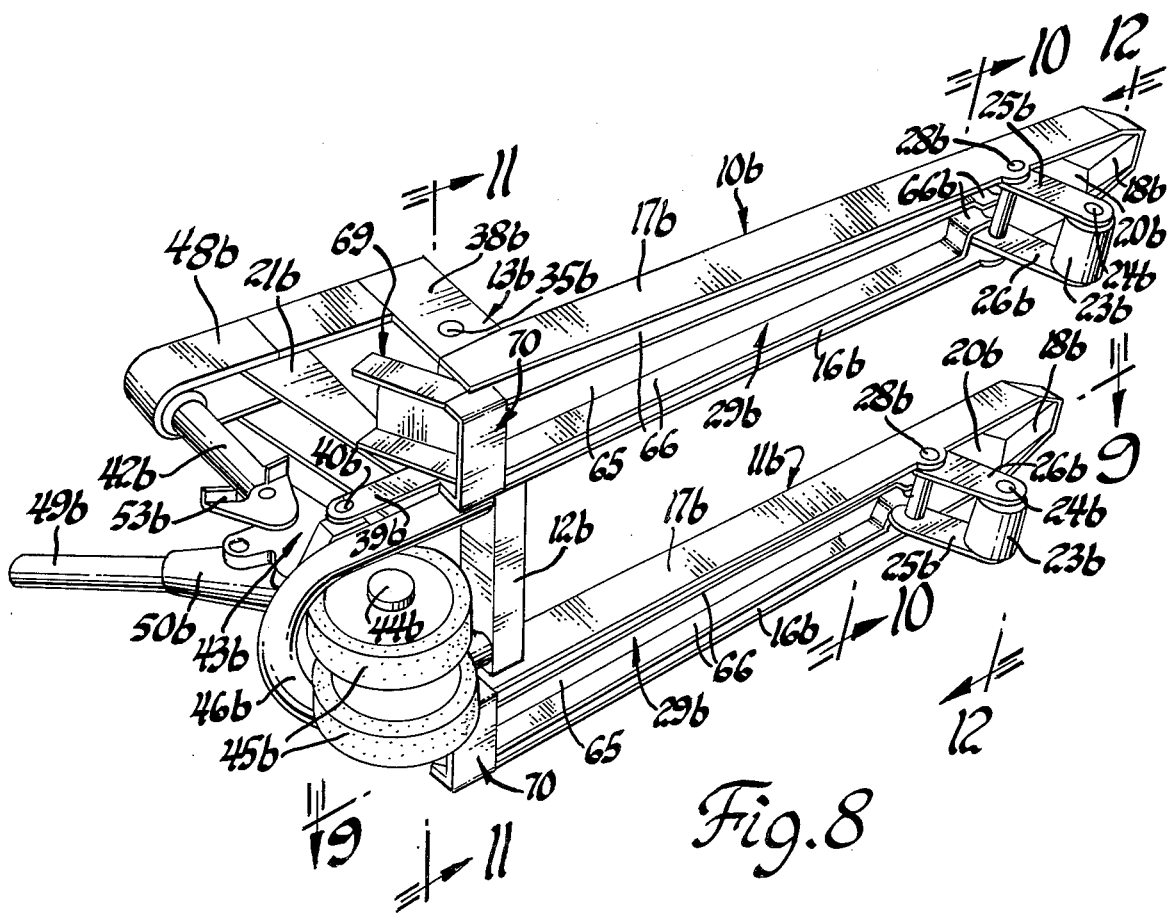
FIG. 8 is the same view as FIG. 7, but showing the pallet truck wheels moved to the down position, thus raising a pallet off the floor, to permit movement of the truck.
Figure 9:
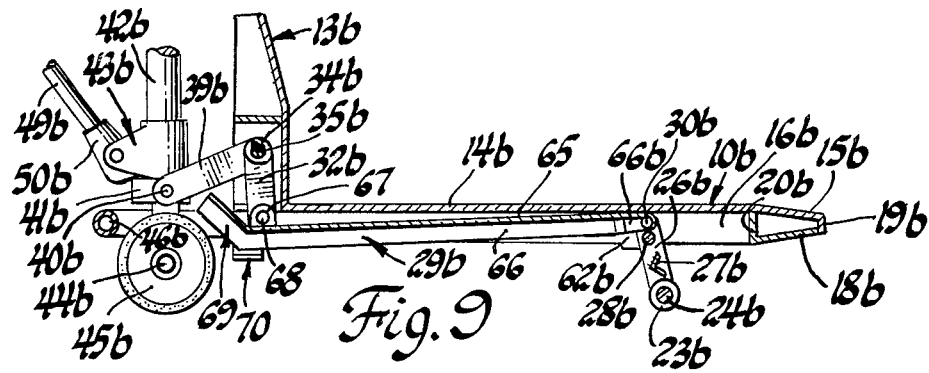
FIG. 9 is a fragmentary, longitudinal section view of the pallet truck structure shown in FIG. 8, taken substantially along the line 9—9 thereof, and looking in the direction of the arrows.
Figure 10:
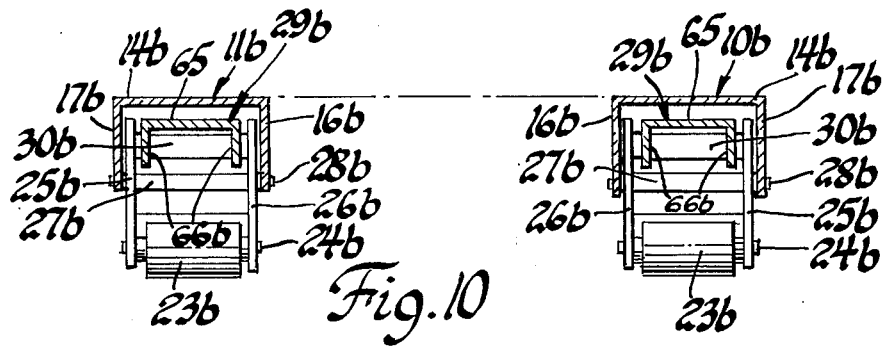
FIG. 10 is an elevational section view of the pallet truck structure illustrated in FIG. 8, taken substantially along the line 10—10 thereof, and looking in the direction of the arrows.

FIGS. 7 through 12 illustrate a second embodiment of the invention, and the parts of the embodiment which are the same as parts of the first embodiment of FIGS. 1 through 6 have been marked with the same reference numerals followed by the small letter b. In the embodiment of FIGS. 7 through 12, the push rod 29 has been changed to an elongated channel, generally designated by the reference numeral 29b. As illustrated in FIG. 10, each of the push rod channels 29b includes an upper horizontal wall 65 and a pair of spaced apart depending side walls 66. The push rod channels 29b thus comprise a pair of inverted elongated channel members.

Figure 7:
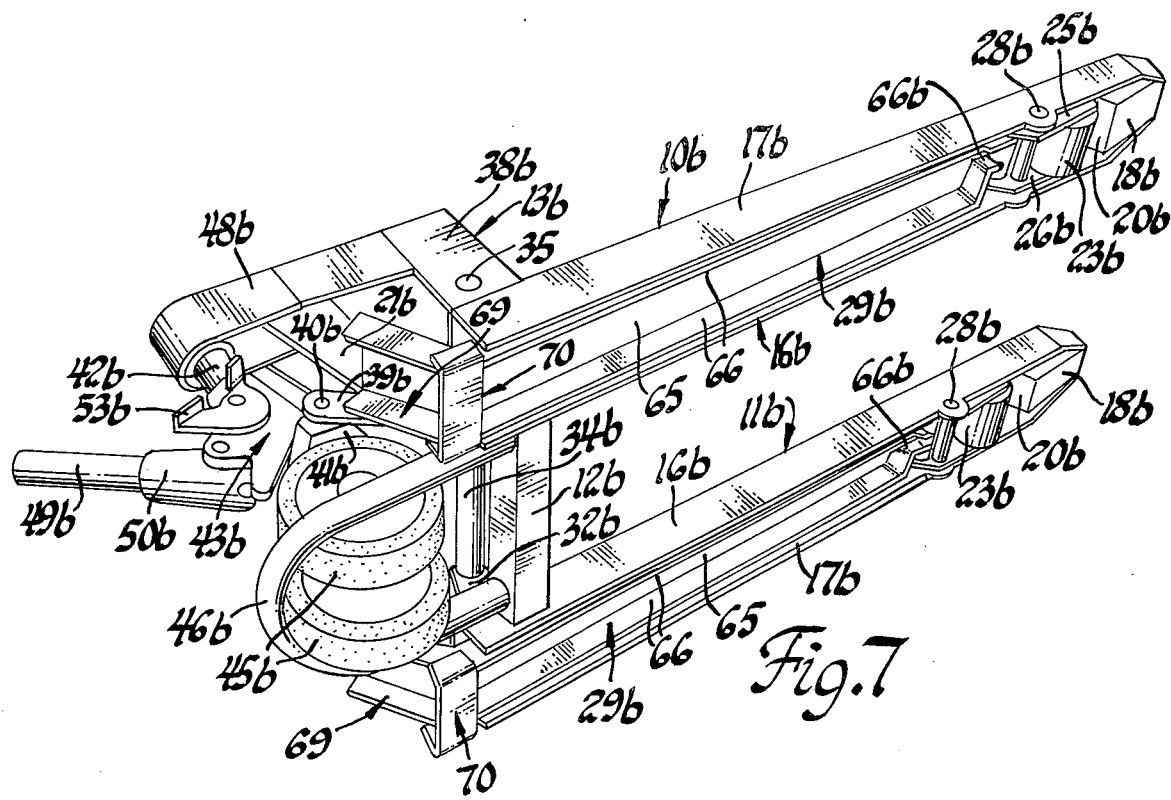
FIG. 7 is a bottom perspective view of a pallet truck illustrating a second embodiment of the invention.

As illustrated in FIGS. 7 and 8, the front ends of the channel walls 66b of a push rod channel 29b are converged inwardly, as indicated by the numerals 66b, so as to be disposed inside of the load roller carrier levers 25b and 26b. The push rod channel wall converged portions 66b are hingedly connected to the adjacent carrier levers 25b and 26b by a suitable pivot shaft 30b, as illustrated in FIG. 9.

Figure 11:
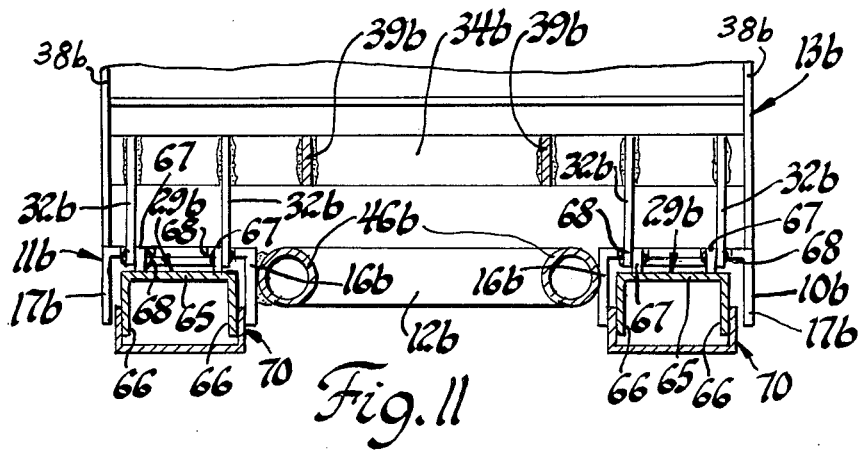
FIG. 11 is a fragmentary, rear end elevational view, partly in section, of the pallet truck structure illustrated in FIG. 8, taken along the line 11—11 thereof, and looking in the direction of the arrows.
Figure 12:
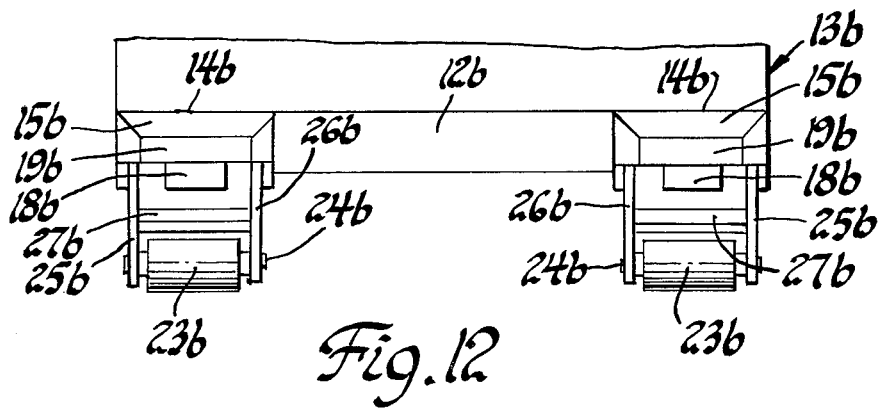
FIG. 12 is a fragmentary, front end elevational view of the pallet truck structure illustrated in FIG. 8, taken along the line 12—12 thereof, and looking in the direction of the arrows.
Figure 13:
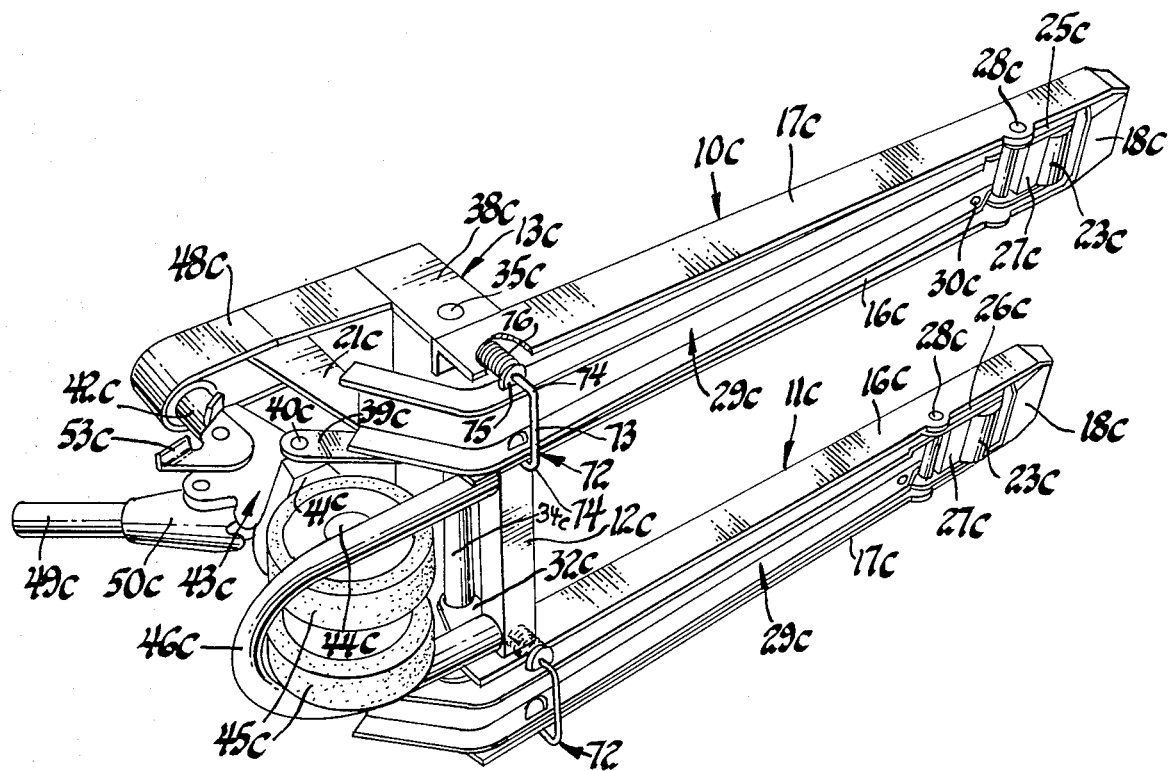
FIG. 13 is a bottom perspective view of a pallet truck illustrating a third embodiment of the invention.

As shown in FIG. 11, each push channel 29b is provided at its rear end with a pair of upwardly extended support brackets 67 which are secured in place by any suitable means, as by welding. The support brackets 67 are each pivotally secured by a suitable pivot pin 68 to the lower end of one of the push rod actuating levers 32b. As shown in FIGS. 7, 8 and 9, each of the push channel members 29b is provided at the rear end thereof with an upwardly extended portion, generally indicated by the numeral 69, to provide easy access by a fork lift tine into each of the push rod channels 29b. As shown in FIGS. 7 through 9, each of the push rod channels 29b is provided at the rear end thereof with a fork lift tine retainer means, in the form of a cross bracket, generally indicated by the numeral 70. The retainer bracket 70 comprises a short length of channel which is fixed to its respective push rod channel 29b by any suitable means as by welding.

The embodiment of FIGS. 7 through 12 functions in the same manner as first described in the first embodiment. When the pump 43b is operated, the pump cylinder rod 42b elevates the rear end of the pallet truck frame, and operates the levers 39b and 32b, in the same manner as described for the first embodiment. The push rod channel 29b is then moved forwardly to pivot the load rollers 23b from the raised position shown in FIG. 7 to the lowered position shown in FIG. 8. The upwardly angled channel portion 69 permits easy insertion of a pair of fork lift tines into the push rod channels 29b, and the retainer cross member 70 prevents a loaded pallet jack from tipping off of the front end of a pair of fork lift tines. The advantage of the embodiment of FIGS. 7 through 12 is that a pair of fork lift tines can be inserted into the push rod channels 29b when the pallet forks 10b and 11b are either in an "up" position, or a "down" position. This last mentioned feature is important in situations where it is necessary to move tall loaded pallets into limited openings, such as truck vans or van trailers with double decking equipment in place.

Figure 14:
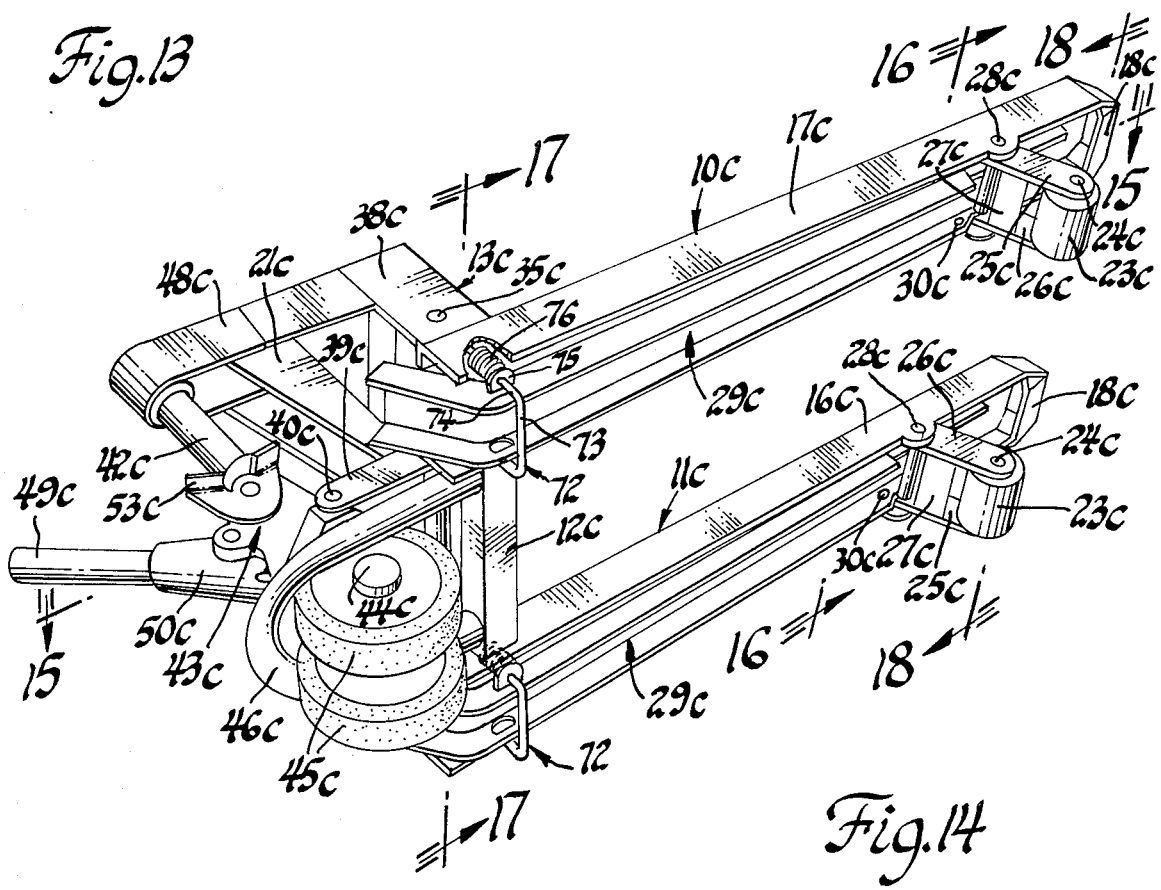
FIG. 14 is the same view as FIG. 13, but showing the pallet truck wheels moved to the down position thus raising a pallet off the floor to permit movement of the truck.
Figure 15:
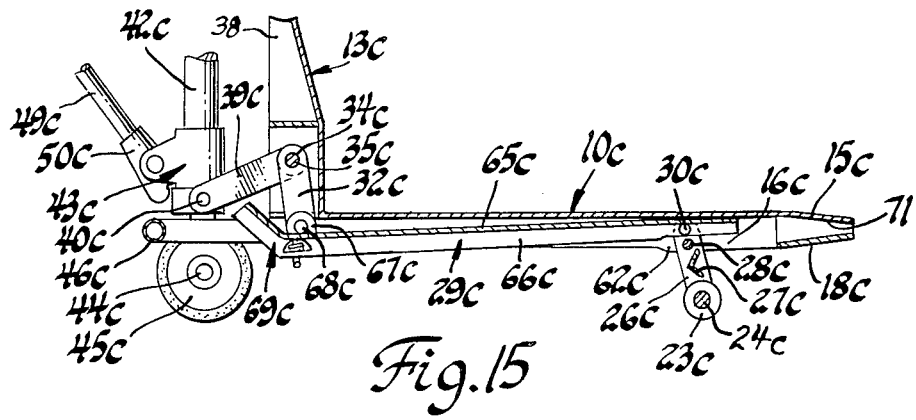
FIG. 15 is a fragmentary, longitudinal section view of a pallet truck structure shown in FIG. 14, taken substantially along the line 15—15 thereof, and looking in the direction of the arrows.
Figure 16:
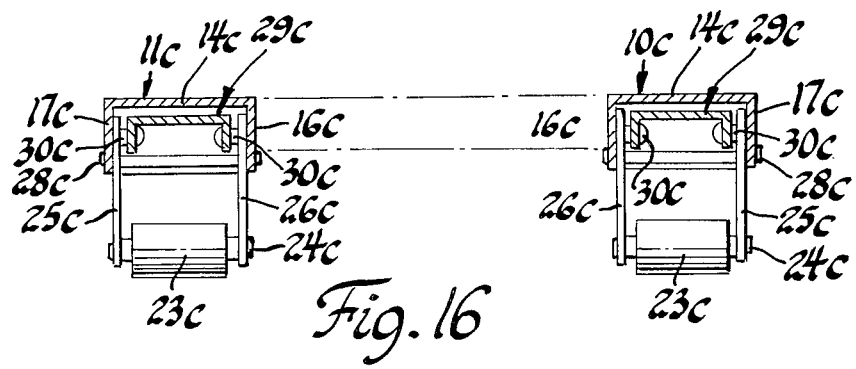
FIG. 16 is an elevational section view of the pallet truck structure shown in FIG. 14, taken substantially along the line 16—16 thereof, and looking in the direction of the arrows.
Figure 17:
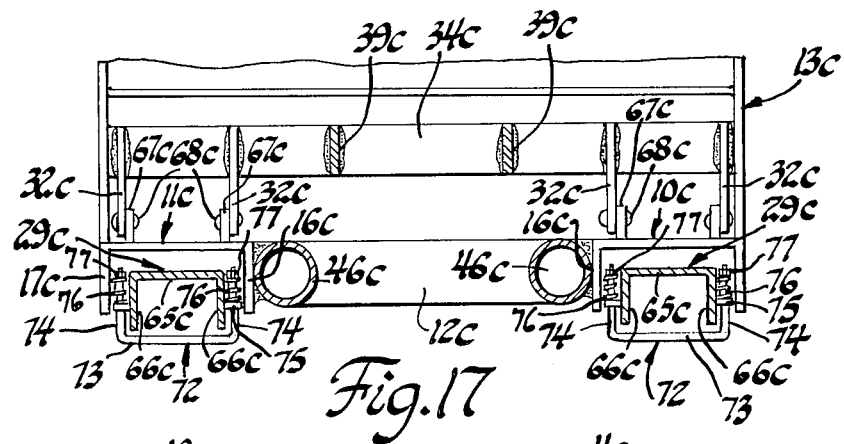
FIG. 17 is a fragmentary, rear end elevational view, partly in section, of the pallet truck structure illustrated in FIG. 14, taken along the line 17—17 thereof, and looking in the direction of the arrows.
Figure 18:
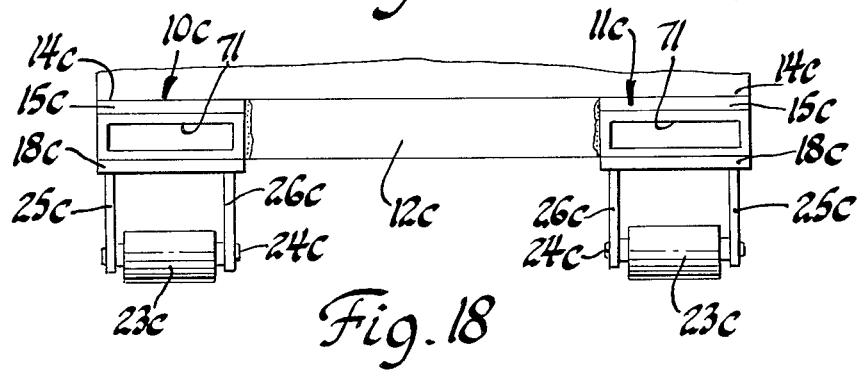
FIG. 18 is a fragmentary, front end elevational view of the pallet truck structure illustrated in FIG. 14, taken along the line 18—18 thereof, and looking in the direction of the arrows.

FIGS. 13 through 18 illustrate a third embodiment of the invention, and the parts of this embodiment which are the same as the parts of the first embodiment of FIGS. 1 through 6, and the parts of the second embodiment of FIGS. 7 through 12, have been marked with the same reference numerals followed by the small letter c. The embodiment of FIGS. 13 through 18 is substantially the same as the second embodiment, with one difference being that the front end of the channel type push rod member 20c does not have its front walls converging, so that the fork tines of a fork lift truck may be inserted into the front end of the push rod channels 29c. As shown in FIGS. 15 and 18, the front end of each of forks 10c and 11c have been left open to provide an opening 71 through which a pair of fork lift tines may be inserted. The fork lift tines would pass through the openings 71, and above the pivot shafts 28 and into the elongated push rod channels 29c when the load rollers 23c are in the lowered position of FIG. 8.

Another difference between the embodiment of FIGS. 7 through 12 and the third embodiment of FIGS. 13 through 18 is that the retainer cross bracket means 70 has been replaced by a spring mounted retainer means generally indicated by the numeral 72. As best seen in FIGS. 14 and 17, the fork lift tine retainer means 72 is U-shaped, and it is made from a rod material. It has a bight portion 73 and two integral and upwardly extended side leg portions 74. The side leg portions 74 of the retainer means 72 are slidably mounted through suitable openings in retainer lugs 75 fixedly mounted on the outer side of the push rod channel side walls 66c. A compression spring 76 is mounted over the upper end of each of the side leg portions 74 and it is retained in place on the lug 75 by a suitable lock nut 77. It will be seen that the retainer means 72 functions in the same manner as the retainer means 70 of the second embodiment, and the retainer means 54 of the first embodiment, when a lift fork tine is inserted into a push rod channel 29c from the rear end thereof. The fork lift tine retainer member means 72 are constructed so as to be moved downwardly during the insertion of a pair of fork lift tines into the forks 10c and 11c, and then to be spring biased upwardly with the bight portion 73 against the lower side of the fork lift tines when they are in position in the forks 10c and 11c.

The embodiment of FIGS. 13 through 18 functions in the same manner as the first described embodiments of FIGS. 1 through 7, and FIGS. 8 through 12. The push rod channel members 29c would function in the same manner as the push rod channel members 29b of the second embodiment for moving the load rollers 23c between the raised position of FIG. 13 and the lowered position of FIG. 14. A pair of fork lift tines may be passed through the openings 71 in the front ends of the forks 10c and 11c when the load rollers 23c are moved to the lowered position shown in FIG. 14. To accommodate the fork tines entering through the front openings 71, and to permit the fork tines to pass sufficiently inside the channels 29c to prevent tipping of the pallet truck, the one-piece pivot pin 30 is replaced by two short pins 30c in each of the forks 10c and 11c. A pair of fork lift tines may be entered into the forks 10c and 11c from the rear ends thereof, regardless of whether the load rollers 23c are in the raised position of FIG. 13 or the lowered position of FIG. 14.

Figure 19:
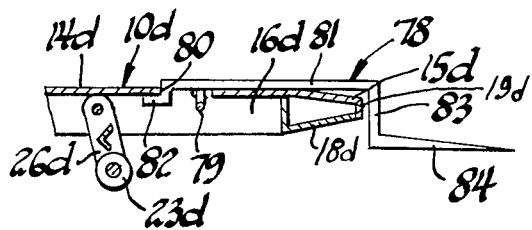
FIG. 19 is a fragmentary, longitudinal section view of the pallet fork structure shown in FIG. 3, and provided with a first type of loose add-on type fork tine.

FIG. 19 illustrates a modification of the invention wherein a detachable fork tine is shown mounted on a pallet truck fork 10d. The parts of the structure of FIG. 19 which are the same as the previously described embodiments have been marked with the same reference numerals followed by the small letter d.

As shown in FIG. 19, an opening 80 has been formed in the upper wall 14d. A detachably mounted tine, generally indicated by the numeral 78, is shown as having an elongated flat plate or body member 81 that is disposed on the front end of the fork 10d. An integrally formed L-shaped retainer lug 82 is formed on the rear end of the plate 81 and it is extended down into the opening 80, and it has a portion thereof extended under the fork plate 14d for retaining the fork tine on the fork 14d and to limit rearward movement of tine 78. A second lug 79 is fixed, as by welding, on the body member 81 and it extends into the hole 80 to limit forward and side shifting movement of tine 78. Integrally formed on the front end of the plate 81, and at right angles thereto, is a downwardly extended attachment arm 83 which has integrally formed on the lower end thereof a forwardly extended fork lift tine 84.

It will be seen that a pallet truck provided with a fork tine 78 on each of its forks may be moved forwardly so as to ram the fork tine 84 under an unpalletized cargo stack sitting on the floor or other surface. After the fork tines 84 have been moved under the cargo stack, the pallet truck can be pumped so as to move the load rollers 23d to the position shown in FIG. 19. to raise the cargo stack so that a timber or the like may be put under the stack, to permit the subsequent insertion of the pallet truck forks per se under the cargo stack for raising and moving the same.

Figure 20:
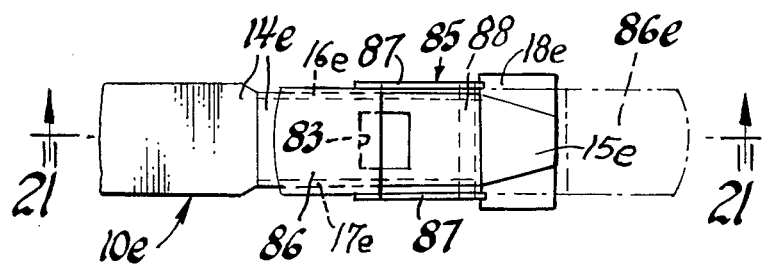
FIG. 20 is a fragmentary, too plan view of a pallet truck fork provided with a second type of fork tine.
Figure 21:
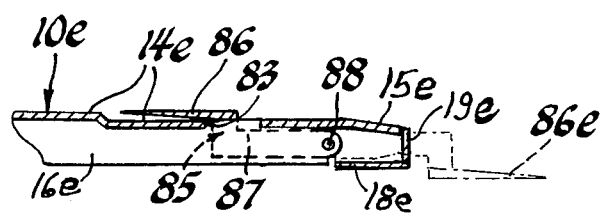
FIG. 21 is a fragmentary, elevational section view of the pallet truck fork and fork tine structure illustrated in FIG. 20, taken along the line 21—21 thereof, and looking in the direction of the arrows.

FIGS. 20 and 21 illustrate a second type of fork lift tine which may be added to the forks of a pallet truck of the present invention. The parts of the structure of FIGS. 20 and 21 which are the same as the previously described embodiments have been marked with the same reference numerals followed by the smaller letter e. The numeral 85 generally indicates a pivotally mounted fork tine, which includes a fork tine member 86 that is carried on a pair of side lever arms 87 which are rotatably mounted on a suitable shaft 88 carried on a pallet fork 10e. The fork tine member 86 is a plate-like member having a fork-like edge, a shown in FIG. 21. The side lever arms 87 are L-shaped, and they have one end thereof fixed, as by welding, to the outer sides of the plate-like fork tine member 86. The other ends of the side lever arms 87 are rotatably mounted on the shaft 88 which is carried by the fork 10e. As shown in FIG. 20, the side lever arms 87 disposed on the outer sides of the front ends of the fork side walls 16e and 17e, which are disposed sideward inwardly relative to the rear end portions thereof. The numeral 83 indicates an opening through the fork top wall 14e. The fork tine 85 is shown in solid lines in the inoperative position so that the fork tine member 86 is folded back on the lowered portion 14e of the top wall of the fork 10e. The fork tine 85 can be swung from the inoperative, solid line position shown in FIGS. 20 and 21, to the broken line operative position, indicated by the numerals 86e. As shown in FIG. 20, the pallet truck fork 10e has the lower, front end wall 18e extended laterally outward, on either side thereof, to provide a support platform on which the side lever amrs 87 are seated when the fork tine 85 is swung to the operative, broken line position indicated by the numeral 86e. The added fork tine shown in FIGS. 20 and 21 would function in the same manner as the added fork tine of FIG. 19. An advantage of the fork tine illustrated in FIG. 20 and 21 is that it is self-storing.

Figure 22:
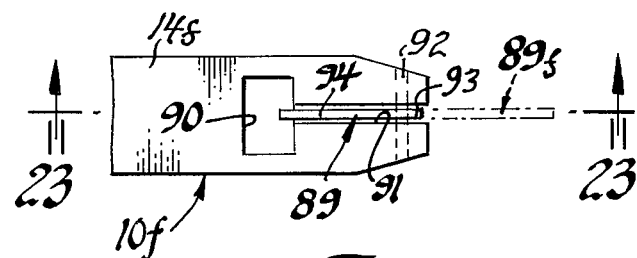
FIG. 22 is a fragmentary top plan view of a pallet truck fork provided with a third type of fork tine.
Figure 23:
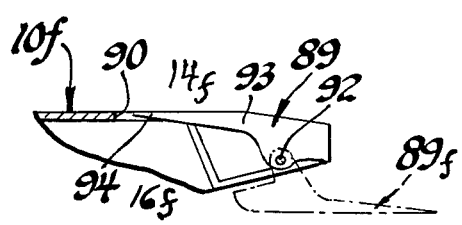
FIG. 23 is a fragmentary, elevational section view of the pallet truck fork and fork tine structure illustrated in FIG. 22, taken along the line 23—23 thereof, and looking in the direction of the arrows.

FIGS. 22 and 23 illustrate still another fork tine which may be employed on the fork of a pallet truck of the present invention. The parts of the structure of FIGS. 22 and 23 which are the same as the previously described embodiments have been marked with the same reference numerals followed by the small letter *f*. The numeral 89 generally indicates a fork tine which can be swung from the self-storing, inoperative, solid-line position, to an operative position indicated by the numeral 89e and shown in broken lines. As best seen in FIG. 23, the pallet truck fork is indicated by the numeral 10f, and it is provided with an opening 90 through the top wall 14f, adjacent the front end thereof. The opening 90 communicates with a recess 91 that extends longitudinally and axially through the fork 10f to the front end of the fork. The fork tine 89 is adapted to be rotatably mounted within the slot 91 on a suitable pivot shaft 92 that is carried by the fork 10f. The fork tine 89 includes a body portion 93 and a tine portion 94. The fork tine 89 is shown in an inoperative position by the solid lines in FIGS. 22 and 23, and in the operative position by the broken-lines indicated by the numeral 89f. The fork tine illustrated in FIGS. 22 and 23 is of a narrower construction than the fork tine embodiment of FIGS. 20 and 21, but it functions in the same manner as the previously described embodiment of FIGS. 20 and 21.

FIG. 24 illustrates a slight modification of the embodiment of FIGS. 13 through 18. The parts of the structure of FIG. 24 which are the same as the previously described embodiments have been marked with the same reference numerals followed by the small letter *g* FIG. 24 shows the fork tine retainer means 72g repositioned in a different place on the push rod channel member. As shown in FIG. 24 the upper end, of the push rod channel upwardly tapered rear end portion 69g, is enclosed by a horizontal plate 95 through which the retainer side leg portions 74g are slidably mounted. The retainer side leg portions 74g have mounted on the upper ends thereof the coil springs 76g which are held in place by suitable lock nuts 77g. It will be understood that when a fork lift tine is passed though the retainer means 72g, that the retainer means 72g would be moved downwardly to the broken line position. After the fork lift tines are fully inserted into the forks of a pallet truck, the srings 76g function to bias the retainer means 72g upwardly into engagement with the bottom of the fork lift tines.

Figure 25:
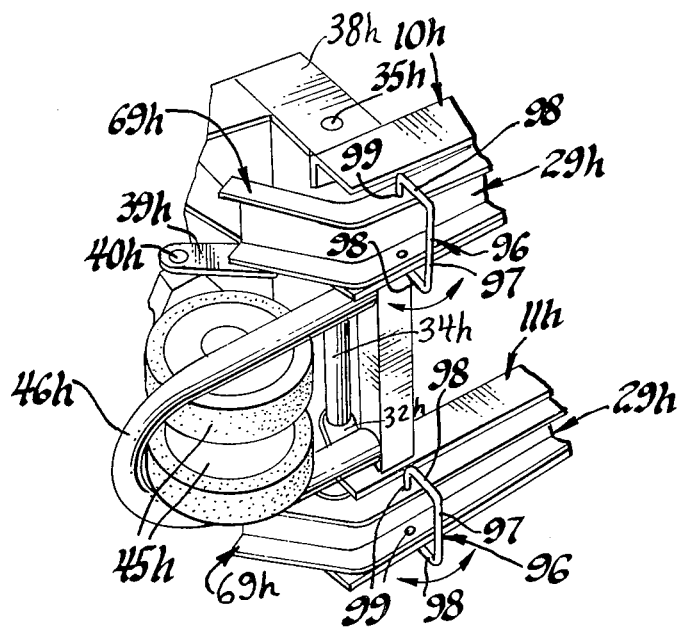
FIG. 25 is a fragmentary perspective view of the pallet truck structure of FIGS. 13 through 18, and showing a modified fork tine retainer means.

FIG. 25 shows a further minor modification of the embodiment of FIGS. 13 through 18. In the structure shown in FIG. 25, the fork lift tine retainer members are swingably mounted, instead of being spring biased in an upward direction. The fork lift tine retainer members shown in FIG. 25 are generally indicated by the numeral 96, and they are U-shaped in an elevation view. Each of the fork lift tine retainer means 96 includes a bight portion 97, and two upwardly extended side leg portions 98 which are provided on their upper ends with turned-in mounting shafts 99. The shafts 99 are pivotally mounted in suitable holes in the side walls of the push rod channels 29h. It will be seen that the retainer means 96 are each swingably mounted so that they will automatically swing away to a position to clear the ground or other surface when the pallet truck is in the lowered position shown in FIG. 13, and yet will swing downwardly to permit a fork lift tine to pass therethrough, when the pallet truck is in the raised position of FIG. 14. The retainer means 96 could be spring biased to have them held rearward (clockwise as viewed in FIG. 25), until needed.

What is claimed is:

1. In a pallet truck having a pair of forks for movement under a palleted load, and wherein said forks are provided with movable load rollers and said pallet truck includes means for moving the load rollers between a raised position and a lowered position, the combination comprising:
    a. each of said forks being hollow and open on at least one of its ends for the insertion of a fork lift into the fork for lifting the pallet truck and moving the same;
    b. fork lift tine retainer means operatively associated with each of the pallet truck forks for retaining each fork on a fork lift tine inserted into the fork; and,
    c. said fork lift tine retainer means including a looped member operatively associated with said means for moving the load rollers between a raised position and a lowered position, so as to move the retainer means to an inoperative position when the load rollers are in a raised position, and to an operative position when the load rollers are in a lowered position.

2. In a pallet truck having a pair of forks for movement under a palleted load, and wherein said forks are provide with movable load rollers and said pallet truck includes means for moving the load rollers between a raised position and a lowered position, the combination comprising:
    a. each of said forks being hollow and open on at least one of its ends for the insertion of a fork for lift tine into the fork for lifting the pallet truck and moving the same;
    b. fork lift retainer means operatively associated with each of the pallet truck forks for retaining each fork on a fork lift tine inserted into the fork;
    c. said means for moving the load rollers between a raised position and a lowered position includes an elongated channel member movably mounted in each of the forks; and, d. said fork lift tine retainer means comprises a cross member fixedly mounted on the rear end of said channel member.

3. In a pallet truck having a pair of forks for movement under a palleted load, and wherein said forks are provided with movable load rollers and said pallet truck includes means for moving the load rollers between a raised position and a lowered position, the combination comprising:

a. each of said forks being hollow and open on at least one of its ends for the insertion of a fork life tine into the fork for lifting the pallet truck and moving the same;

b. fork lift tine retainer means operatively associated with each of the pallet truck forks for retaining each fork on a fork lift tine inserted into the fork;

c. said means for moving the load rollers between a raised position and lowered position including an elongated channel member movably mounted in each of the forks; and d. each of said channel members including an upwardly turned end portion for guiding a fork lift tine into the channel member.

4. A pallet truck as defined in claim 3, wherein:

a. said fork lift tine retainer means comprises a spring biased loop member mounted on said upwardly turned channel end portion.

5. In a pallet truck having a pair of forks for movement under a palleted load, and wherein said forks are provided with movable load rollers and said pallet truck includes means for moving the load rollers between a raised position and a lowered position, the combination comprising:

a. each of said forks being hollow and open on at least one of its ends for the insertion of a fork lift tine into the fork for lifting the pallet truck and moving the same;

b. fork lift tine retainer means operatively associated with each of the pallet truck forks for retaining each fork on a fork lift tine inserted into the fork;

c. said means for moving the load rollers between a raised position and lowered position including an elongated channel member movably mounted in each of the forks; and d. said fork lift tine retainer means comprising a spring biased loop member mounted on each channel member adjacent the rear end thereof.

6. In a pallet truck having a pair of forks for movement under a palleted load, and wherein said forks are provided with movable load rollers and said pallet truck includes means for moving the load rollers between a raised position and a lowered position, the combination comprising:

a. each of said forks being hollow and open on at least one of its ends for the insertion of a fork lift tine into the fork for lifting the pallet truck and moving the same;

b. fork lift tine retainer means operatively associated with each of the pallet truck forks for retaining each fork on a fork lift tine inserted into the fork;

c. said means for moving the load rollers between a raised position and lowered position including an elongated channel member movable mounted in each of the forks; and, d. said fork lift tine retainer means comprising a loop member swingably mounted on each channel member adjacent the rear end thereof.

7. In a pallet truck having a pair of forks for movement under a palleted load, and wherein said forks are provided with movable load rollers and said pallet truck includes means for moving the load rollers between a raised position and a lowered position, the combination comprising:

a. each of said forks being hollow and open on at least one of its ends for the insertion of a fork lift tine into the fork for lifting the pallet truck and moving the same;

b. fork lift tine retainer means operatively associated with each of the pallet truck forks for retaining each fork on a fork lift tine inserted into the fork; and, c. each of said forks being open at both ends thereof to allow insertion of a fork lift tine into each fork from either end.

8. In a pallet truck having a pair of forks for movement under a palleted load, and wherein said forks are provided with movable load rollers and said pallet truck includes means for moving the load rollers between a raised position and lowered position, the combination comprising:

a. each of said forks being hollow and open on at least one of its ends for the insertion of a fork lift tine into the fork for lifting the pallet truck and moving the same;

b. fork lift tine retainer means operatively associated with each of the pallet truck forks for retaining each fork on a fork lift tine inserted into the fork; and c. a fork tine mounted on the front end of each fork.

9. A pallet truck as defined in claim 8, wherein:

a. each of the fork tines is detachably mounted on its respective fork.

10. A pallet truck as defined in claim 8, wherein:

a. each of the fork tines is pivotally mounted on its respective fork for movement between inoperative and operative positions.

11. A pallet truck as defined in claim 1, including:

a. a fork tine mounted on the front end of each fork and having a knife blade-like outer end edge offset downwardly from the fork for sliding movement under a palleted load.

12. A pallet truck as defined in claim 11, wherein:

a. each of the fork tines is detachably mounted on its respective fork.

13. A pallet truck as defined in claim 11, wherein:

a. each of the fork tines is pivotally mounted on its respective fork for movement between inoperative and operative positions.

14. A pallet truck as defined in claim 6, including:

a. a fork tine mounted on the front end of each fork and having a knife blade-like outer end edge offset downwardly from the fork for sliding movement under a palleted load.

15. A pallet truck as defined in claim 14, wherein:

a. each of the fork tines is detachably mounted on its respective fork.

16. A pallet truck as defined in claim 14, wherein:

a. each of the fork tines is pivotally mounted on its respective fork for movement between inoperative and operative positions.

17. A pallet truck as defined in claim 7, including:

a. a fork tine mounted on the front end of each fork and having a knife blade-like outer end edge offset downwardly from the fork for sliding movement under a palleted load.

18. A pallet truck as defined in claim 17, wherein:

a. each of the fork tines is detachably mounted on its respective fork.

19. A pallet ruck as defined in claim 17, wherein:

a. each of the fork tines is pivotally mounted on its respective fork for movement between inoperative and operative positions.

* * * * *

UNITED STATES PATENT OFFICE
CERTIFICATE OF CORRECTION

Patent No. 4,027,771  Dated June 7, 1977

Inventor(s) Thomas F. Adams

It is certified that error appears in the above-identified patent and that said Letters Patent are hereby corrected as shown below:

```
Column 1, line 9, "laods" should read -- loads --.
Column 1, line 56, "load" second occurrence should read -- loads --.
Column 2, line 26, "load" should read -- loads --.
Column 2, line 46, "object" second occurence should read -- invention --
Column 2, lines 46 through 63 should be deleted.
Column 4, line 18, "too" should be -- top --.
Column 5, line 9, "fixed" should read -- fixedly --.
Column 9, line 36 "20c" should read -- 29c --.
Column 11, line 21, "amrs" should read -- arms --.
Column 11, line 26, "Fig". should read -- Figs. --.
Claim 1, line 39, after "lift" insert -- tine --.
Claim 2, line 56, "provide" should read -- provided --.
Claim 2, line 61, delete "for" at end of line.
Claim 3, line 21, after "and" insert -- a --.
```

Signed and Sealed this

Sixth Day of September 1977

[SEAL]

Attest:

RUTH C. MASON  
*Attesting Officer*

LUTRELLE F. PARKER  
*Acting Commissioner of Patents and Trademarks*